(No Model.)

T. KENNEDY, Dec'd.
J. FARLEY, Administrator.
SIPHON WATER CLOSET.

No. 376,002. Patented Jan. 3, 1888.

Witnesses:
Wm D. Conner
Harry Drury

Inventor:
Thomas Kennedy
by his Attorneys
Howson & Sons

UNITED STATES PATENT OFFICE.

THOMAS KENNEDY, OF PHILADELPHIA, PENNSYLVANIA; JAMES FARLEY ADMINISTRATOR OF SAID THOMAS KENNEDY, DECEASED.

SIPHON WATER-CLOSET.

SPECIFICATION forming part of Letters Patent No. 376,002, dated January 3, 1888.

Application filed February 28, 1887. Serial No. 229,160. (No model.)

*To all whom it may concern:*

Be it known that I, THOMAS KENNEDY, a citizen of the United States, and a resident of Philadelphia, Pennsylvania, have invented certain Improvements in Siphon Water-Closets, of which the following is a specification.

My invention relates to that class of water-closets in which the contents of the bowl are discharged by a siphon action, the object of my invention being to provide simple and efficient means for forming the siphon and to prevent accidental siphoning of the closet.

Figure 1:
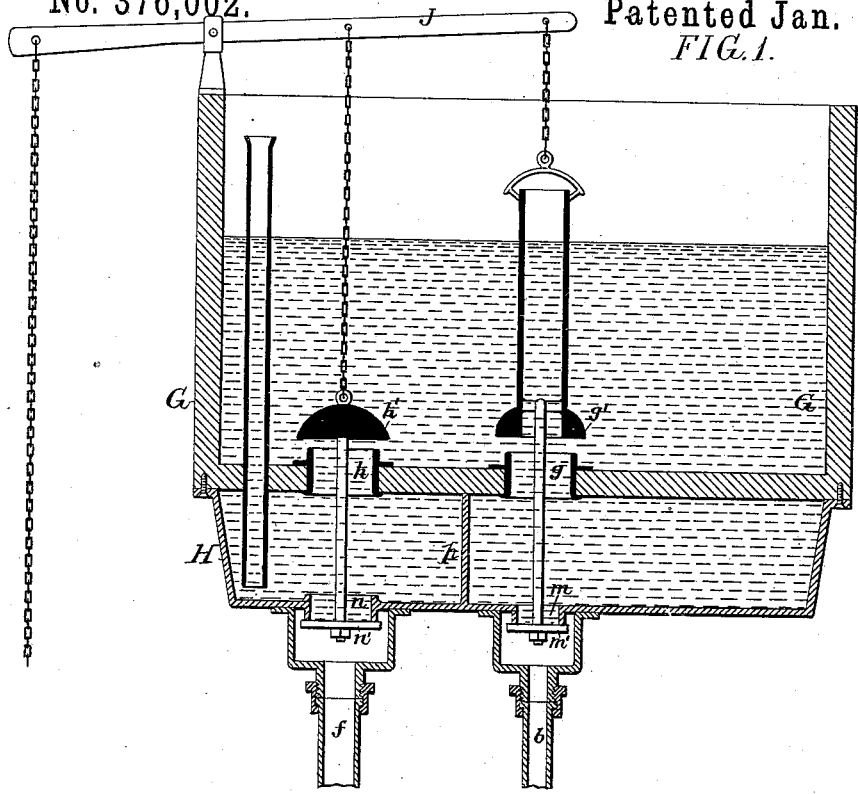
Figure 2:
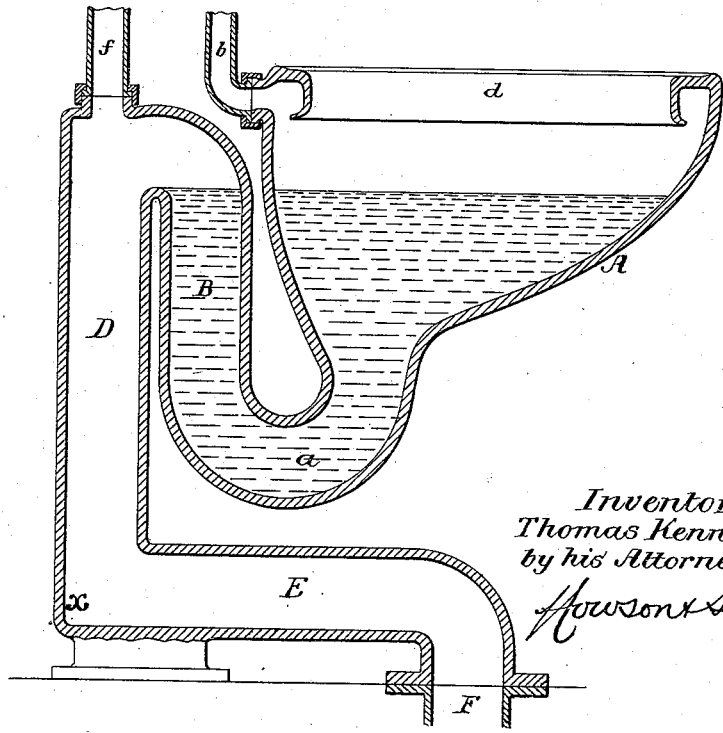

In the accompanying drawings, Figure 1 shows in section the supply-tank, valves, and parts of the bowl and jet supply-pipes; and Fig. 2 is a sectional view of the bowl, its siphoning-ducts, discharge branch, and parts of the bowl and jet-pipes.

A is the bowl of the closet, which may be of any desired shape consistent with the free discharge of the contents, this bowl communicating at the bottom, through a trap, $a$, with the short leg B of the discharge-siphon, the long leg D of which is in the present instance bent at right angles at the lower end, so as to form a lateral discharge branch, E, which is bent downward at its outer end, in order to communicate with the soil-pipe F. The entire structure, comprising the parts A, $a$, B, D, and E, may be in one piece; or the bowl A may be separate; and the parts $a$, B, D, and F may, if desired, be made by pipes, bends, and elbows properly joined together. Above the water-closet is the usual supply-tank, G, with service-box H, the latter communicating through a pipe, $b$, with the flushing-rim $d$ around the top of the water-closet bowl, and also through a pipe, $f$, with the upper end of the long leg D of the siphon. The reservoir has two openings, $g$ and $h$, through which it communicates with the service-box beneath, and the latter has openings $m$ and $n$, through which it communicates, respectively, with the pipes $b$ and $f$. Around each opening is a flange forming a valve seat, and to the seats around the openings $g$ and $m$ are adapted valves $g'$ and $m'$, suspended from the operating-lever J, the valve $g'$ closing on the downward movement and the valve $m'$ on the upward movement. To the valve-seats around the openings $h$ and $n$ are adapted similar valves, $h'$ and $n'$, likewise suspended from the lever J and operating in the same manner as the valves $g'$ and $m'$. On the elevation of the long arm of the lever, therefore, the valves $g'$ and $h'$ will be lifted and the valves $m'$ and $n'$ closed, the service-box being filled with water from the reservoir, and on the descent of the long arm of the lever the upper valves will be closed and the lower valves opened, so as to permit a flow of water through the pipes $b$ and $f$. The flow of water from the pipe $f$ into the upper end of the long leg D of the siphon drives the air therefrom and creates a partial vacuum in said long leg, so as to start the siphon and forcibly withdraw the contents from the bowl A, the flow of water into the bowl through the pipe $b$ continuing long enough to refill said bowl after the contents have been siphoned from the same, for it will be observed that the service-box is divided by a partition, $p$, into two chambers, one feeding the pipe $f$, and the other, which is somewhat larger, feeding the pipe $b$. The lateral discharge branch E at the lower end of the long leg D of the siphon is of advantage, because the stream of water, striking at $x$ a surface at right angles to the direction of said stream, is caused to splash into the branch E, and thus carry along through the same the air carried down from the leg D, any flow of air back through the branch being effectually prevented. The present application is limited to this feature of construction, the construction of the service-box and the combination of the siphoning-ducts with a water-pipe discharging a jet directly into the upper end of the long leg of the siphon forming part of the subject-matter of a separate application filed by me July 11, 1887, Serial No. 243,918. It will be observed that there is no trap or weir chamber between the siphon and soil-pipe, so that there is no risk of clogging when wads of paper, towels, or other bodies are through carelessness, ignorance, or malice thrown into the closet.

I claim as my invention—

The combination of a water-closet bowl and its siphoning-ducts, a water-pipe discharging a jet into the long leg of the siphon, and a lateral discharge branch, the bottom of which does not extend above the bottom of said leg, whereby an impact-surface is formed adjacent to the inlet of the discharge branch, said surface being substantially at right angles to the direction of the jet descending the long leg of the siphon, as and for the purpose specified.

In testimony whereof I have signed my name to this specification in the presence of two subscribing witnesses.

THOS. KENNEDY.

Witnesses:
WILLIAM D. CONNER,
HARRY SMITH.